United States Patent [19]

Grassme

[11] 4,155,003
[45] May 15, 1979

[54] ADJUSTABLE ELECTRONIC TIME SWITCH

[75] Inventor: Ulrich Grassme, Nüremberg, Fed. Rep. of Germany

[73] Assignee: Siemens Aktiengesellschaft, Berlin & Munich, Fed. Rep. of Germany

[21] Appl. No.: 855,892

[22] Filed: Nov. 30, 1977

[30] Foreign Application Priority Data

Dec. 6, 1976 [DE] Fed. Rep. of Germany ....... 2655168

[51] Int. Cl.² ............................................. G06M 3/02
[52] U.S. Cl. ............................. 235/92 T; 235/92 PE; 235/92 CV; 235/92 R
[58] Field of Search ............ 235/92 T, 92 DP, 92 PT, 235/92 CA, 92 V, 92 CV; 340/347 P; 250/570

[56] References Cited

U.S. PATENT DOCUMENTS

| | | | |
|---|---|---|---|
| 3,746,842 | 7/1973 | Fowler | 235/92 CV |
| 3,824,378 | 7/1974 | Johnson et al. | 235/92 CA |
| 3,824,379 | 7/1974 | Tomisawa et al. | 235/92 CA |
| 3,835,384 | 9/1974 | Liff | 235/92 UX |
| 3,930,142 | 12/1975 | Meier | 235/92 CA |

Primary Examiner—Joseph M. Thesz
Attorney, Agent, or Firm—Hill, Gross, Simpson, Van Santen, Steadman, Chiara & Simpson

[57] ABSTRACT

In the illustrated embodiments, a rotary position encoder is manually positioned to select any of a set of x-ray exposure times to be used in making medical x-ray photographs. In one form, the encoder output selects a code word from a read only memory, and a comparator ends the timing cycle when a counter reaches a count value corresponding to the active code word. The pulse generator supplying input pulses to the counter, rather than operating at a constant rate, may be controlled so that the pulse count per unit time corresponds to a specified mAs-product, an x-ray tube being switched off when a selected count value (corresponding to a desired mAs-product) is reached.

1 Claim, 3 Drawing Figures

ADJUSTABLE ELECTRONIC TIME SWITCH

BACKGROUND OF THE INVENTION

The invention relates to an adjustable electronic time switch (or timer) comprising a pulse counter for pulses arriving in chronological succession, selection means in order to specify in advance a predetermined counter position (or count) consisting of a series of selectable counter positions and means for producing an output pulse upon attainment of a preselected counter position which has been specified in advance.

An electronic time switch can be basically constructed such that there is conveyed to the comparator the respective present counter position, and such that there is conveyed to the second input of the comparator a signal which characterizes that particular preselected counter position upon the attainment of which an output pulse, e.g. for the purpose of triggering specified switching operations, is produced. However, it is also possible to construct the counter in the form of a frequency divider which delivers an output signal subsequent to a predetermined number of input pulses which number is adjustable by means of a selection device.

SUMMARY OF THE INVENTION

The object which is the basis of the invention consists in producing a time switch of the type initially cited wherein the adjustment of the desired times is rendered possible through simply constructed selection means.

In accordance with the invention, this problem is solved by virtue of the fact that the impulse counter is a binary counter and the selection means is a coding switch for the purpose of specifying in advance a bit configuration, and that the number of switching positions of the code switch and the number of different bit configurations is equal to the number of desired time intervals. In the inventive time switch, for example, it is possible, with a bit configuration of five bits, to select $2^5 = 32$ different time intervals. The selection means can be a stage switch of a mechanical type whose number of planes is equal to the number of bits of the desired bit configuration. However, it is also possible, in a particularly simple fashion, to construct the selection means in the form of an optoelectronic position indicator exhibiting a number of code tracks corresponding to the desired number of code positions of the bit configuration.

Other objects, features and advantages of the invention will be apparent from the following detailed description taken in connection with the accompanying sheet of drawings.

DETAILED DESCRIPTION

Figure 1:
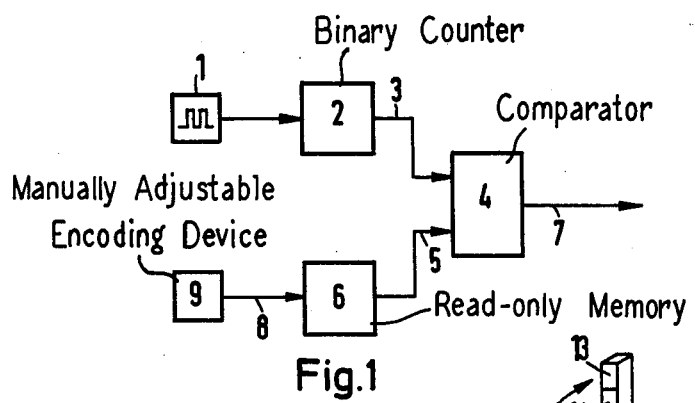
FIG. 1 illustrates the block circuit diagram of a time switch in accordance with the invention.

FIG. 1 illustrates a pulse generator 1 which delivers pulses in chronological succession; for example, in equal time intervals. These pulses are conveyed to a binary counter 2 which is constructed in the form of an n-bit or n-stage counter. Thus, there is connected to the n-conductor output 3 of binary counter 2 an n-position binary word which characterizes the respective counted number of input pulses (the attained count value). This signal is delivered to the input of a comparator 4. At the other input 5 of the comparator 4 there is connected an n-position binary word supplied by a read-only-memory 6, said binary word characterizing that particular pulse count value upon the attainment of which the comparator 4 is to produce an output signal at its output 7. For this purpose, the read-only memory contains z words each composed of n bits. The respective word is selected by means of an adjustable coding device 9 connected to its one input 8. The variable z represents the number of selectable time intervals. When the signal at input 5 of comparator 4 is equal to the signal at input 3; i.e., the selected binary word at the output of memory 6 is equal to the attained binary word at the output of binary counter 2, the desired time has elapsed and an output pulse results at output 7.

Figure 2:
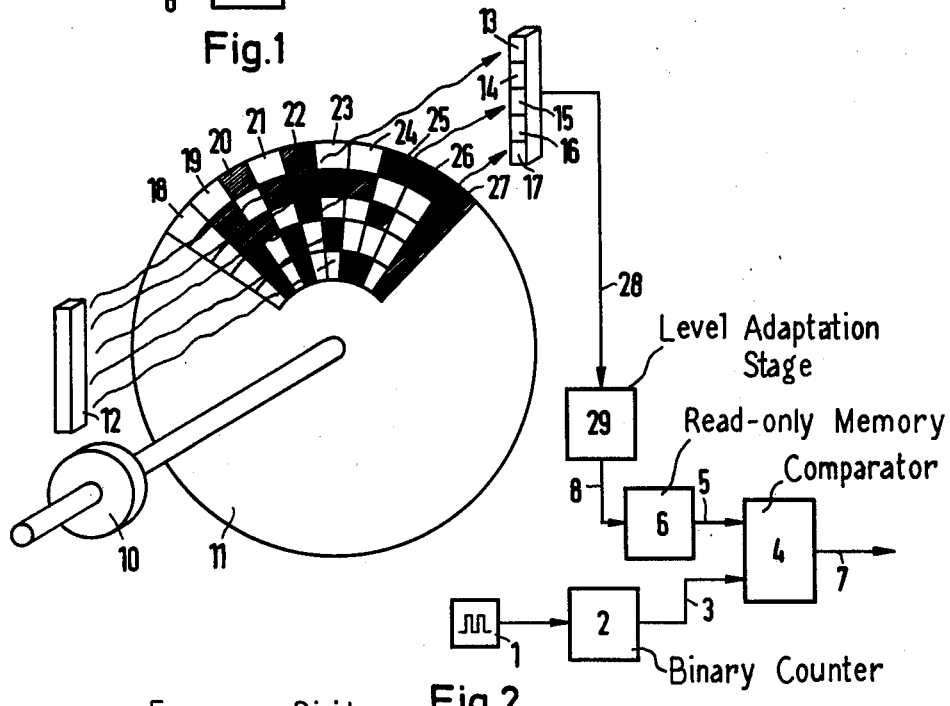
FIG. 2 illustrates the time switch in accordance with FIG. 1 in connection with a preferred selection means for selecting the desired time interval.

From FIG. 2, it is apparent that the coding device is an opto-electronic position indicator exhibiting a number of code tracks corresponding to the desired number of positions n' of the bit configuration (e.g. five). The position indicator manifests a rotatably mounted disk or code wheel 11 which is detented by means of a detent mechanism 10 providing a desired number of positions z (such as thirty-two). On the one side of said disk there is arranged elongated light transmitter 12 and on the other side, a number of light receivers 13 through 17, corresponding to the position number n' of the bit configuration, said light receivers being aligned in each of the detent positions in relation to one another and in relation to the position of the marking places of disk 11 for reliable readout of a corresponding bit configuration. In the sample embodiment, the bit configuration has five positions so that there are also five recording or code tracks present on disk 11. The tracks are subdivided radially into sectors 18 through 27, etc. The number of sectors is equal to the number of the desired time intervals. In each sector the individual tracks are marked (or characterized) with a 0- or a 1-information bit. Thus, in a specified position of disk 11, light receivers 13 through 17 connect to line 28 the bit configuration which corresponds to the interrogated sector, said bit configuration characterizing the selected time interval. This bit configuration is connected to the input 8 of read-only memory 6. In addition, there is interposed a level adaptation stage 29.

Figure 3:
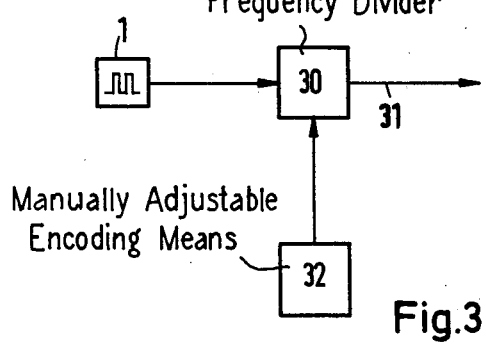
FIG. 3 illustrates the block circuit diagram of another time switch in accordance with the invention.

In the sample embodiment according to FIG. 3 a frequency divider in the form of an impulse counter is connected to the output of pulse generator 1. Said frequency divider 30 emits an output signal at its output 31 subsequent to a selectable number of input impulses. For example the counter 30 may emit an output pulse upon reaching its count capacity, the counter being presettable by introducing the complement of the desired count value into the counter prior to each counting cycle. This predetermined number of input impulses or desired count value is preselectable through adjustable encoding means 32. Thus, selection means 32 permit the preselection of the divider ratio of frequency divider 30. In this sample embodiment, also, the encoding means can be constructed corresponding to components 6 and 10–29, and if required a complement value may be transmitted by momentary manual enabling of stage 29 once the desired encoder position has been manually selected.

Where the number of binary stages of counter 2 or 30 exceeds the number of tracks on disc 11, the embodiments of FIGS. 2 and 3 should each include a read-only memory addressed by the bit configuration from receivers 13–17, but capable of supplying binary words to comparator 4 or counter 30 with a number of bits corresponding to the number of stages of the counter. For example, in FIG. 2, each binary word in the read-only memory 6 would correspond to a count value representing a desired exposure time or mAs value, while in FIG. 3, the read-only memory might contain the binary complements of such count values, for setting the counter 30 to operate as a frequency divider with each desired divider ratio.

The electronic time switches described are particularly suitable for determining the exposure time of x-ray photographs. Pulse generator 1 may be a free-running generator; for example, a multivibrator which supplies pulses at a constant rate during each timing cycle. However, it is also possible to construct this pulse generator in such a manner that the pulse count per time unit corresponds to a specified mAs-product, so that the signal at output 7, or 31, respectively, also corresponds to a specified mAs-product. In both instances, the signal can be utilized for the purpose of switching off the x-ray tube.

Within the framework of the invention, a shift switch with a light-permeable, linearly movable plate with coding corresponding to plate 11 can be employed as a opto-electronic position indicator.

It will be apparent that many modifications and variations may be effected without departing from the scope of the novel concepts and teachings of the present invention.

I claim as my invention:

1. An adjustable electronic time switch comprising a multistage pulse counter for assuming successive different counter conditions in response to chronologically successive input pulses, the successive counter conditions representing input count values corresponding to successive different numbers of said input pulses, and selection means operable in conjunction with said pulse counter for producing a selection means output pulse in response to any of a predetermined set of input count values registered by said counter, said selection means comprising a coding device operable to produce respective digitally coded bit configurations for selecting respective ones of said predetermined set of input count values, whereby any of a number of different time intervals corresponding to the number of said input count values of said set may be selected by corresponding selection of the position of said coding device, said coding device being an electronic position indicator for producing respective digitally coded bit configurations in respective mechanical positions thereof, the number of such mechanical positions at least corresponding to the number of said input count values of said set, whereby a desired number of different time intervals is selected by actuating the coding device to respective corresponding mechanical positions, the position indicator comprising a rotatably mounted code wheel having detent means for defining successive mechanical positions thereof, said indicator having a number of light receivers corresponding to the number of elements of the bit configurations produced thereby, the angular position of the code wheel relative to the light receivers determining the bit configuration supplied by means of said coding device.

* * * * *